(No Model.)
A. STEWART.
STEAM COOKING APPARATUS.
No. 545,745. Patented Sept. 3, 1895.
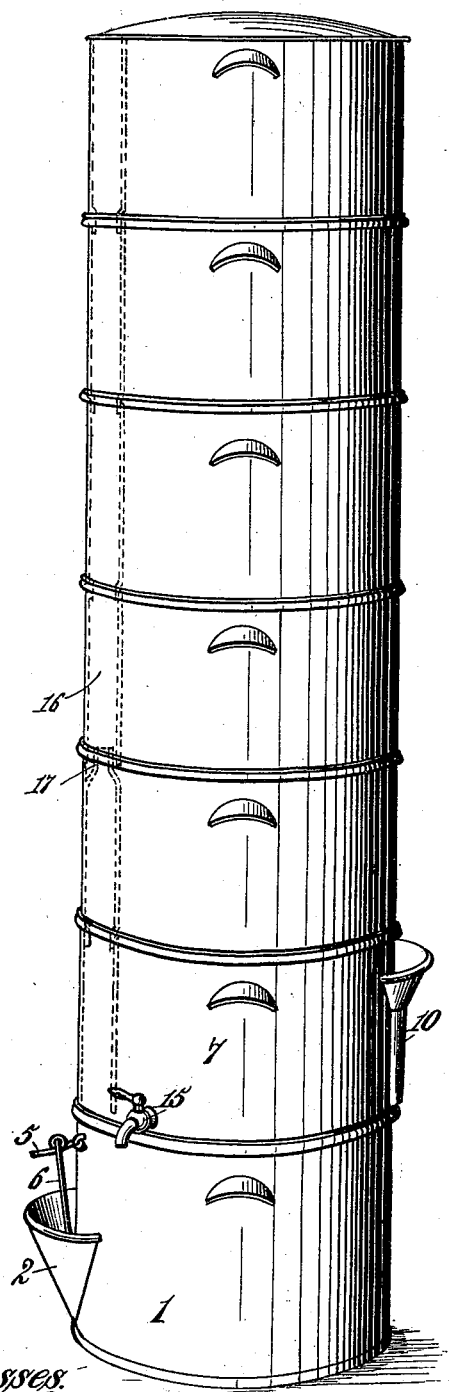
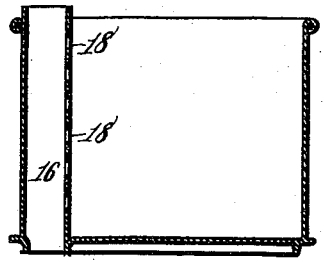
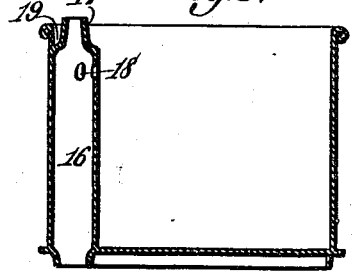
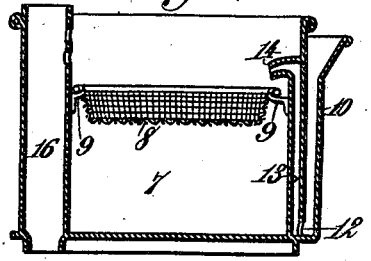
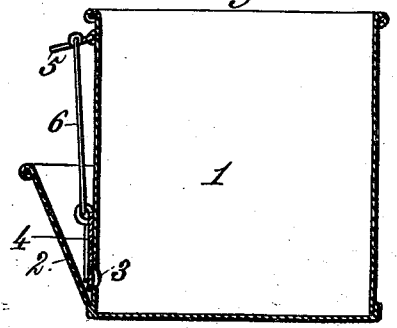
Witnesses.
Robert Everett.
Dennis Sumby.
Inventor:
Alace Stewart.
By James L. Norris,
Atty.

UNITED STATES PATENT OFFICE.

ALACE STEWART, OF SAN FRANCISCO, CALIFORNIA.

STEAM COOKING APPARATUS.

SPECIFICATION forming part of Letters Patent No. 545,745, dated September 3, 1895.

Application filed May 10, 1895. Serial No. 548,841. (No model.)

*To all whom it may concern:*

Be it known that I, ALACE STEWART, a citizen of the United States, residing at San Francisco, in the county of San Francisco and State of California, have invented new and useful Improvements in Steam Cooking Apparatus, of which the following is a specification.

My invention relates to steam cooking apparatus, my object being to provide simple and efficient means whereby meat, vegetables, and other edible substances may be cooked by steam alone without being exposed to the danger of absorbing water produced by the condensation of steam and thereby becoming soggy or water-soaked, provision being made whereby the water of condensation shall be conducted from the cooking-vessels downward and received in a separate soup-pan thus preserving and imparting to the soup the various essences and flavors which, being more or less volatile, are absorbed by the condensed steam.

It is my purpose, also, to provide a steam cooking apparatus in which by a simple adjustment of a cut-off or valve in the water-vessel the steam-pressure may be increased and the temperature of the steam raised more or less above the normal point of steam generation, thus enabling the apparatus to cook different articles of food more thoroughly and perfectly and to completely preserve the distinctive flavor of the same.

It is a further purpose of my invention to provide a steam cooking apparatus with a coffee-leaching vessel so constructed that boiling water supplied to an exterior spout will be poured over and caused to percolate the coffee, which is supported by a foraminous pan, the same water being repeatedly drawn off and returned, passing each time through the coffee, until every particle of soluble material is extracted.

It is my object, finally, to simplify and improve the construction and operation of cooking apparatus of this type, to reduce the expense of operating the same by diminishing the consumption of fuel required, and to preserve the distinctive flavors of the substances cooked, thereby rendering them more palatable.

My invention consists, to these ends, in the novel features of construction and in the new parts and combinations of parts hereinafter fully explained, and then particularly pointed out and defined in the claims which conclude this specification.

To enable those skilled in the art to fully understand and to make and use my said invention, I will proceed to describe the same in detail, reference being had for this purpose to the accompanying drawings, in which—

Figure 1 is a perspective view of an apparatus in which my invention is incorporated. Fig. 2 is a detail view of one of the steam cooking-vessels. Fig. 3 is a detail view of the vessel in which the water of condensation is received and in which the soup is prepared. Fig. 4 is a detail view of the coffee-leaching vessel. Fig. 5 is a detail view of the water-vessel or boiler.

The reference-numeral 1 in said drawings indicates the water-vessel or boiler, which is preferably cylindrical and adapted by its construction to receive heat from a range, stove, oil, or gas heater. Upon one side the water-vessel is provided with a spout or funnel-shaped attachment 2, mounted on the exterior face of the wall and converging toward the same from the open top downward. The semiconoidal wall of the spout has its point of convergence at or a little above the bottom of the vessel 1 and communicates with the latter through an opening 3 in its wall. Arranged in suitable guides upon said wall is a valve or cut-off 4, operated by a lever 5, which has its fulcrum on the exterior of the wall and is connected to the valve by a stem or link 6. This valve closes the opening 3 sufficiently to prevent the passage of steam from the vessel into the spout, but not so closely as to cut off the flow of water from the spout to the interior of the vessel or from the vessel to the spout.

The coffee-leaching vessel, soup-pan, and steam cookers are superposed upon the water-vessel and derive their heat therefrom. It is evident that I may use any required number of these vessels, and my invention, therefore, is not limited in this respect. The relative order in which said vessels are arranged is also susceptible to variation, and the order in which they are described hereinafter is merely for convenience.

The coffee-leaching vessel 7 corresponds in form with the boiler 1, being adapted to seat upon and close the open top of the same or of any one of the separate vessels. It is provided in its interior with a diaphragm 8 of woven wire or any other suitable material upon which the coffee is spread, said diaphragm being arranged at a convenient point between the top and bottom, and being preferably supported by lugs 9, whereby it may be readily removed. Upon the exterior of the vessel is formed or mounted a spout 10, which extends to the bottom, or nearly so, where it communicates through an opening 12 with the lower end of an interior spout or passage 13, which rises upon the inner face of the wall of the vessel to a point about an inch, more or less, below the level of the top of the exterior spout 10. At its top this interior spout 13 is provided with a trough-shaped outlet 14, which curves over toward the center of the vessel and is adapted to discharge into the diaphragm which contains the coffee. It will readily be seen that by pouring boiling water into the outer spout it will flow into and be discharged from the interior spout, thereby flooding the coffee spread upon the diaphragm and extracting its essence. After passing the diaphragm the hot water filters into the bottom of the vessel, from which it may be drawn through a cock 15 and again passed through the coffee, this being repeated as many times as may be necessary. As long as the fluid remains in the leaching-vessel, it is subjected to heat from the steam generated in the boiler.

The soup-pan is a vessel corresponding in form to the others, on one of which it is seated. Like all the other vessels which are arranged above the boiler, it has a vertical steam-passage 16 at one side, the lower end of which drops slightly below its bottom and enters the upper end of the steam-passage in the vessel next below. In the soup-pan, however, in which the condensation is to be collected, the upper end of the steam-passage 16 is contracted to form a neck 17, which enters the lower end of the steam-passage next above, the contraction being such that condensation, flowing down the inner surface of the passage in the upper vessel, will flow upon the exterior of the passage 16 in the soup-pan and be collected in the latter. Each of said steam-passages 16, with the exception of that in the soup-pan, is provided with steam-openings 18 to allow the steam to flow freely from the passage to the interior of the vessel. These openings are covered with wire-gauze or other suitable material to prevent any substances placed in the vessel from entering and passing down in the steam-passage.

Any desired number of the steam cooking-vessels may be employed, and the steam-passages in each are provided with openings, as described, for the inflow of steam, and with apertures located close to the bottom of the vessel to conduct the water of condensation back to the soup-pan. The upper end of the steam-passage in the latter is contracted within the wall of the pan, whereby a trough 19 is formed which catches the downflow and prevents it from escaping to the outside.

By my invention I am able to effect a considerable economy in fuel, since by closing the valve or cut-off 4 I separate the cooler water in the spout 2 from that in the boiler, shut off all circulation, and confine the steam in the boiler sufficiently to produce an increase in the temperature of the steam of 60° Fahrenheit, or thereabout. This increase not only expedites the process of cooking, but permits substances to be cooked by this method which are ordinarily treated by different processes. By raising the valve 4 at any moment the height of the water in the boiler can be ascertained and regulated.

By collecting the water of condensation in the soup-pan I preserve many volatile essences and flavors of both meats and vegetables which would otherwise be wasted. As these are more or less readily absorbed by water and contain some of the most concentrated and delicate nourishing ingredients, the value and importance of the result may readily be estimated.

What I claim is—

1. In a steam-cooking apparatus, a coffee leaching vessel having two spouts arranged respectively on the exterior and interior of the vertical side wall of the vessel and communicating at their lower ends by an aperture formed in said wall, the interior spout having an outlet at a point below the level of the exterior spout, substantially as described.

2. In a steam-cooking apparatus, a coffee-leaching vessel having a foraminous diaphragm and provided with two spouts arranged respectively on the exterior and interior of the vertical side wall of the vessel and communicating at the lower ends by an aperture formed in said wall, the interior spout having a curved outlet at its upper end which discharges onto said diaphram at a point below the top of the exterior spout, substantially as described.

3. In a steam-cooking apparatus, the combination with a boiler of one or more cooking vessels, all having steam passages communicating with each other and with the boiler, said passages having openings to permit steam to enter the interior of said vessels, and a soup-pan provided with a steam passage closed save at its ends, the upper end being contracted to form a neck entering the lower end of the passage above and adapted to receive the condensed steam on its exterior and conduct it into the soup-pan, substantially as described.

4. In a steam-cooking apparatus, the combination with a boiler of one or more cooking vessels each having a perforated steam passage the upper end of which receives the lower end of the passage in the vessel next above, and a soup-pan arranged between the boiler and said vessels and provided with a steam passage which is closed save at its ends, the upper end being contracted to form a neck loosely entering the passage next above and lying wholly within the wall of the pan, whereby the water of condensation from above will be received upon the outside of the passage in said soup-pan and be collected in the latter, substantially as described.

In testimony whereof I have hereunto set my hand in presence of two subscribing witnesses.

ALACE STEWART.

Witnesses:
F. J. FILBERT,
H. C. HITZEMANN.